(12) United States Patent
Beall et al.

(10) Patent No.: US 7,794,014 B2
(45) Date of Patent: Sep. 14, 2010

(54) MULTIMEDIA CHAIR AND METHOD

(75) Inventors: P. Shawn Beall, Belvidere, IL (US);
John F. LaSalvia, Las Vegas, NV (US)

(73) Assignee: Ozio LLC, Machesney Park, IL (US)

( * ) Notice: Subject to any disclaimer, the term of this patent is extended or adjusted under 35 U.S.C. 154(b) by 42 days.

(21) Appl. No.: 12/026,996

(22) Filed: Feb. 6, 2008

(65) Prior Publication Data
US 2008/0185888 A1  Aug. 7, 2008

Related U.S. Application Data

(60) Provisional application No. 60/899,953, filed on Feb. 7, 2007.

(51) Int. Cl.
 *A47C 7/72* (2006.01)
(52) U.S. Cl. .................................. 297/217.4; 297/217.3
(58) Field of Classification Search ............. 297/217.3, 297/217.4, 273, 274, DIG. 10
See application file for complete search history.

(56) References Cited

U.S. PATENT DOCUMENTS

| | | | | |
|---|---|---|---|---|
| 3,948,379 | A * | 4/1976 | Warner | 297/217.3 X |
| 5,143,055 | A * | 9/1992 | Eakin | 297/217.4 X |
| 5,807,177 | A * | 9/1998 | Takemoto et al. | 297/217.3 X |
| 6,375,259 | B1 * | 4/2002 | Ma | 297/217.3 |
| 6,530,842 | B1 * | 3/2003 | Wells et al. | 297/217.3 X |
| 7,039,207 | B1 * | 5/2006 | Elrod et al. | 297/217.3 X |
| 7,125,074 | B2 * | 10/2006 | Real et al. | 297/217.3 |
| 7,273,251 | B2 * | 9/2007 | Real et al. | 297/217.3 |
| 2003/0107248 | A1 * | 6/2003 | Sanford et al. | 297/217.3 |
| 2004/0183346 | A1 * | 9/2004 | Sanford et al. | 297/217.3 |
| 2005/0067866 | A1 * | 3/2005 | Luong | 297/217.3 |
| 2006/0031081 | A1 | 2/2006 | Arne | |
| 2006/0092284 | A1 | 5/2006 | Goodman et al. | |
| 2006/0224517 | A1 | 10/2006 | Shimpi et al. | |
| 2006/0265280 | A1 | 11/2006 | Nakada et al. | |
| 2007/0273187 | A1 * | 11/2007 | Tanizawa et al. | 297/217.3 |
| 2008/0054561 | A1 * | 3/2008 | Canterbury et al. | 297/217.3 X |
| 2008/0072509 | A1 * | 3/2008 | Eberhardt | 297/217.3 X |
| 2008/0111408 | A1 * | 5/2008 | Duran et al. | 297/217.4 |

FOREIGN PATENT DOCUMENTS

| | | |
|---|---|---|
| DE | 101 49 225 A1 | 7/2002 |
| DE | 20 2004 017 141 U1 | 1/2005 |
| GB | 2 407 971 A | 5/2005 |

* cited by examiner

*Primary Examiner*—Rodney B White
(74) *Attorney, Agent, or Firm*—Leydig, Voit & Mayer, Ltd.

(57) ABSTRACT

A multimedia chair (200) includes an electronic module having an electronic processor and at least one electronic controller operatively connected to the electronic processor. A visual display (120) is connected to the electronic module and operatively communicates with the electronic processor. A base (202) structure connected to the electronic module is connected to a chair (200).

12 Claims, 6 Drawing Sheets

MULTIMEDIA CHAIR AND METHOD

CROSS-REFERENCE TO RELATED APPLICATIONS

This patent application claims the benefit of U.S. Provisional Patent Application No. 60/899,953, filed Feb. 7, 2007, which is incorporated by reference.

TECHNICAL FIELD

This patent disclosure relates generally to multimedia devices and applications therefor and, more particularly, to an electronic advertising and multimedia entertainment system that is modular and attachable to a chair.

BACKGROUND

Known electronic devices used for generating streams of advertising are known. For example, digital display screens positioned in public places, such as airport terminals, shopping malls, or elevators, that are positioned within sight of passer-bys and that cycle through advertisement messages and displays have been used in the past. Even though such systems are known and used by advertisers, their effectiveness in reaching their target audiences cannot, typically, be determined with accuracy. Moreover, their passive nature does not effectively reach to members of the public to capture their attention, diminishing their revenue generating potential.

To address this issue, some systems invite members of the public to interact with a device in order to capture a person's attention by providing services that the person desires. Such examples include entertainment centers that are positioned in public areas and that offer electronic services to users, for example, Internet access, email service, and/or wireless network connectivity (hot-spots). Such systems, generically known as kiosks, rely on payment by the customer for use of the services provided. Even though these kiosks have been successful in the past, the ever growing use and popularity of mobile electronic devices offering the same or similar services has and will probably continue to reduce their popularity and revenue-generating potential.

BRIEF SUMMARY

This disclosure provides, in one aspect, a method for generating a revenue stream from at least one multimedia chair. The method includes placing the multimedia chair in a public area and operating it in an advertising mode when a user is not present. Operation in the advertising mode includes periodically representing on a visual output display a series of advertisement, each advertisement including at least one of images, video, and sound. As can be appreciated, each of the series of advertisements is provided by a respective advertiser and is displayed in exchange for a an advertising fee. The multimedia chair can, of course, operate in an entertainment mode when a user is present, thus generating an additional source of revenue.

In another aspect, this disclosure provides a method of operating a multimedia chair. The method includes operating the visual display of the multimedia chair in an advertising mode, which includes periodically displaying one of a plurality of pre-determined advertisements. When the presence of a user in the chair is detected, operation switches to a user mode when the user is seated and interacting with the chair. When payment from the user for use of services for a predetermined time is received and processed, a timer can be activated and incremented while operating a function of the chair and/or at least one entertainment routine. When the time purchased for entertainment by the user has lapsed, the transaction is recorded and may be reported to a central controller while the multimedia chair resumes operation in the advertising mode.

In yet another aspect, this disclosure provides a multimedia chair that includes an electronic module having an electronic processor and at least one electronic controller operatively connected to the electronic processor. A visual display is connected to the electronic module and operatively communicates with the electronic processor. A base structure connected to the electronic module is connected to a chair.

DETAILED DESCRIPTION OF THE DISCLOSURE

This disclosure describes an apparatus for and method of generating revenue and providing electronic services to people found in public areas, such as, airport terminals, malls, and so forth. As can be appreciated, the revenue may be generated from the members of the public using the apparatus or, alternatively, from promoters wanting to display their advertisements or provide other services to the public. The disclosure provides an embodiment using a massage chair, which a user can use to purchase a timed massage. When the chair is in use, an electronic processor coupled to a visual display may be used to provide a broad range of electronic services to the user. When the chair is not in use, the visual display may advantageously operate in an automated and pre-programmed fashion to display promotional and/or advertising information to the surrounding public. Alternative embodiments using, for example, non-mechanical chairs and/or recliners are contemplated.

The embodiments described herein are meant for illustration by way of example and should not be construed as limiting on the scope of the disclosure. As can be appreciated, the devices and methods disclosed herein are far superior to existing modes of advertising and/or providing electronic services to persons in public places insofar as a new service or function is provided, the massage function of the chair, which operates to increase the overall use and revenue generating potential by attracting users and captivating their attention.

Figure 1:
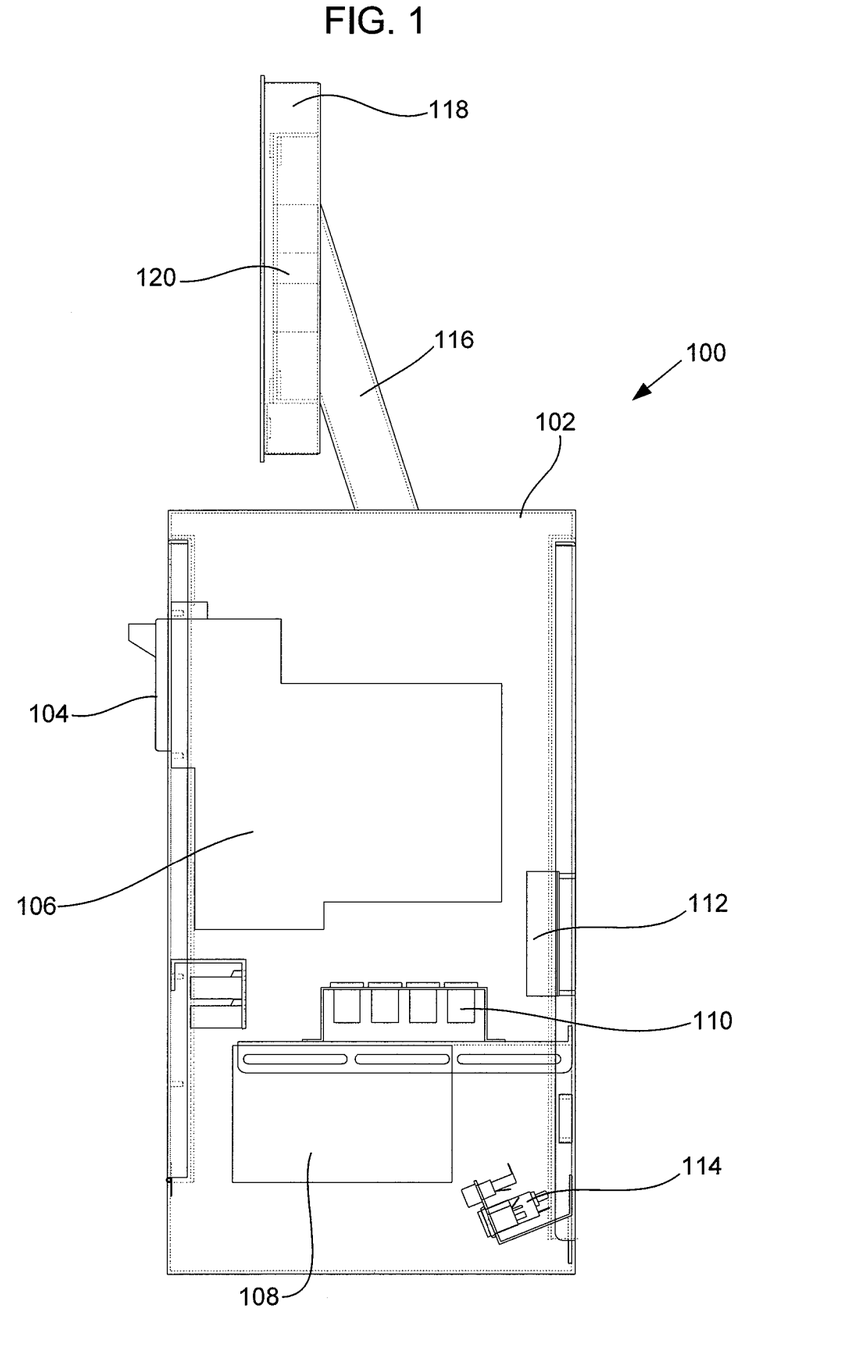
FIG. 1 is an outline view of an electronics module for use with a multimedia massage chair in accordance with the disclosure.

An outline view of an entertainment module 100 for use with the present disclosure is shown in FIG. 1. The entertainment module 100 is shown with a cover removed for clarity and illustration of its internal components. The entertainment module 100 includes a housing 102, which is a secured enclosure for the electronic and/or mechanical components of the entertainment module 100. Internally, the entertainment module 100 essentially includes a payment receiver 104, a vault 106 attached to the payment receiver 104, an electronics board 108, a series of power outlets 110 used for internal component power, a cooling fan 112, and an electrical power interface 114, all housed completely within the housing 102. Externally, a post 116 is connected to the top of the housing 102 and supports a screen housing 118. The post 116 houses a series of signal conductors (not shown) that connect the electronics board 108 with a visual display 120 positioned within the screen housing 118. The visual display 120 may be, for example, a liquid crystal or plasma monitor, and may also be integrated into the housing 102 in an alternative embodiment.

The entertainment module 100 can advantageously operate as a stand alone personal computer. The electronics board 108, for example, may include a computer "mother-board" having various electronic circuits operably associated therewith, for example, a central processor, permanent or temporary memory chips, a video card, a network adapter, a modem, a hard disk drive, and so forth. The visual display 120 may simply be used to output information from the electronics board 108 but, as can be appreciated, may be used for input of information via, for example, touch-screen functionality. As can be appreciated, the visual display 120 may be installed for right-handed or left-handed operation by the user.

As part of an appropriate local area network (LAN), the entertainment module 100 can be configured to perform any function a computer might be expected to perform, for example, access to the Internet, entertainment, email, news, weather, and so forth if an external internet connection is provided. The payment receiver 104 may be used for collection of cash and/or acceptance of payment by credit cards or other types of cards via the front of the housing 102. If payment by a user is rendered in cash, the vault 106 can discreetly and safely collect the cash until the owner can come to retrieve it. Alternatively, payment may be received in the form of tokens or coins that may be stored separately from bills. Moreover, the vault 106 may include an appropriate sensor configured to send a signal indicative of unauthorized entry or tampering with the vault 106. Electronic credit transactions may be processed, as described below, electronically.

Figure 2:
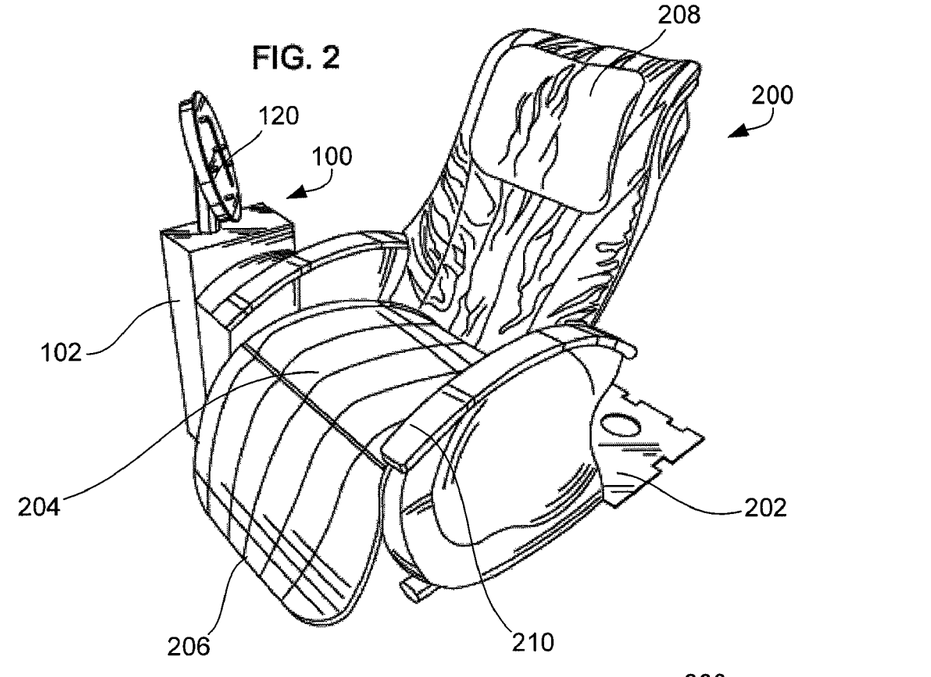
FIGS. 2 and 3 are outline views from different perspectives of one embodiment for a multimedia massage chair in accordance with the disclosure.
Figure 3:
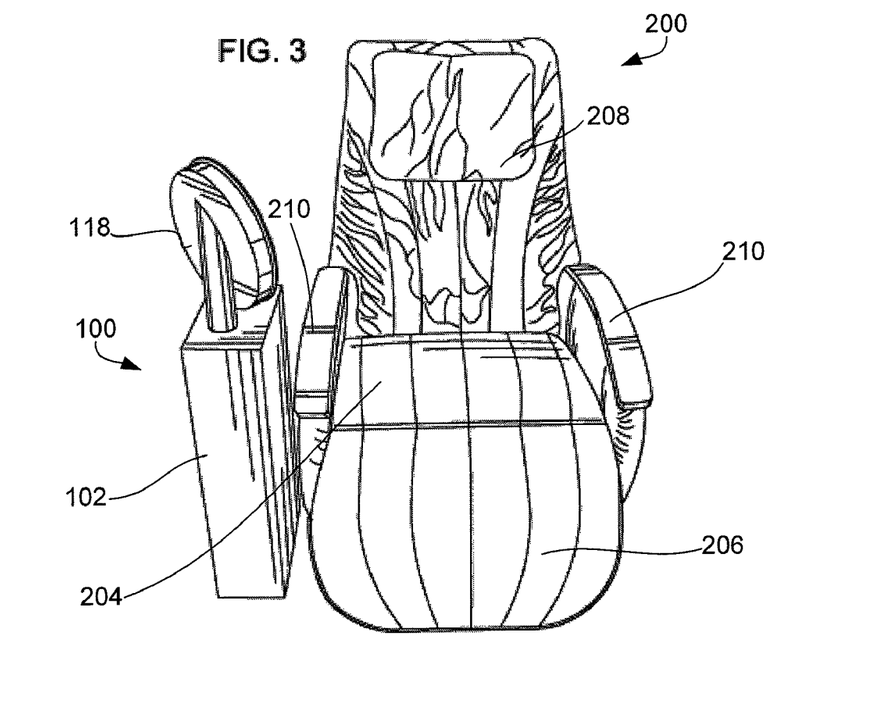

The entertainment module 100 can be especially useful when combined with a mechanical massage chair 200, as shown in the two outline views of FIG. 2 and FIG. 3. The entertainment module 100 in the embodiment shown is connected on one side of the chair 200 such that the visual display 120 is viewable by a user seated in the chair 200, but is also viewable by people walking around or past the chair 200.

The chair 200 is attached to a base 202, which connects the chair 200 and the entertainment module 100 to each other and may be used to connect multiple chairs 200 (not shown) together to form a cluster. The chair 200 includes a seat portion 204, a footrest 206, a backrest 208, and two armrests 210. Although the armrests 210 are shown without any devices integrated therewith, they can alternatively be fitted with various controls that are operatively connected to the entertainment module 100, for example, volume controls, music or video playback controls, headphone jacks, and so forth. Further, the armrests 210 may include chair controls, such as recline levers, footrest extend levers, and so forth. The various seating surfaces of the chair 200 may be covered in a durable yet comfortable material, for example, leather, fabric, or any other material that is capable of resisting repeated use and wear.

Figure 4:
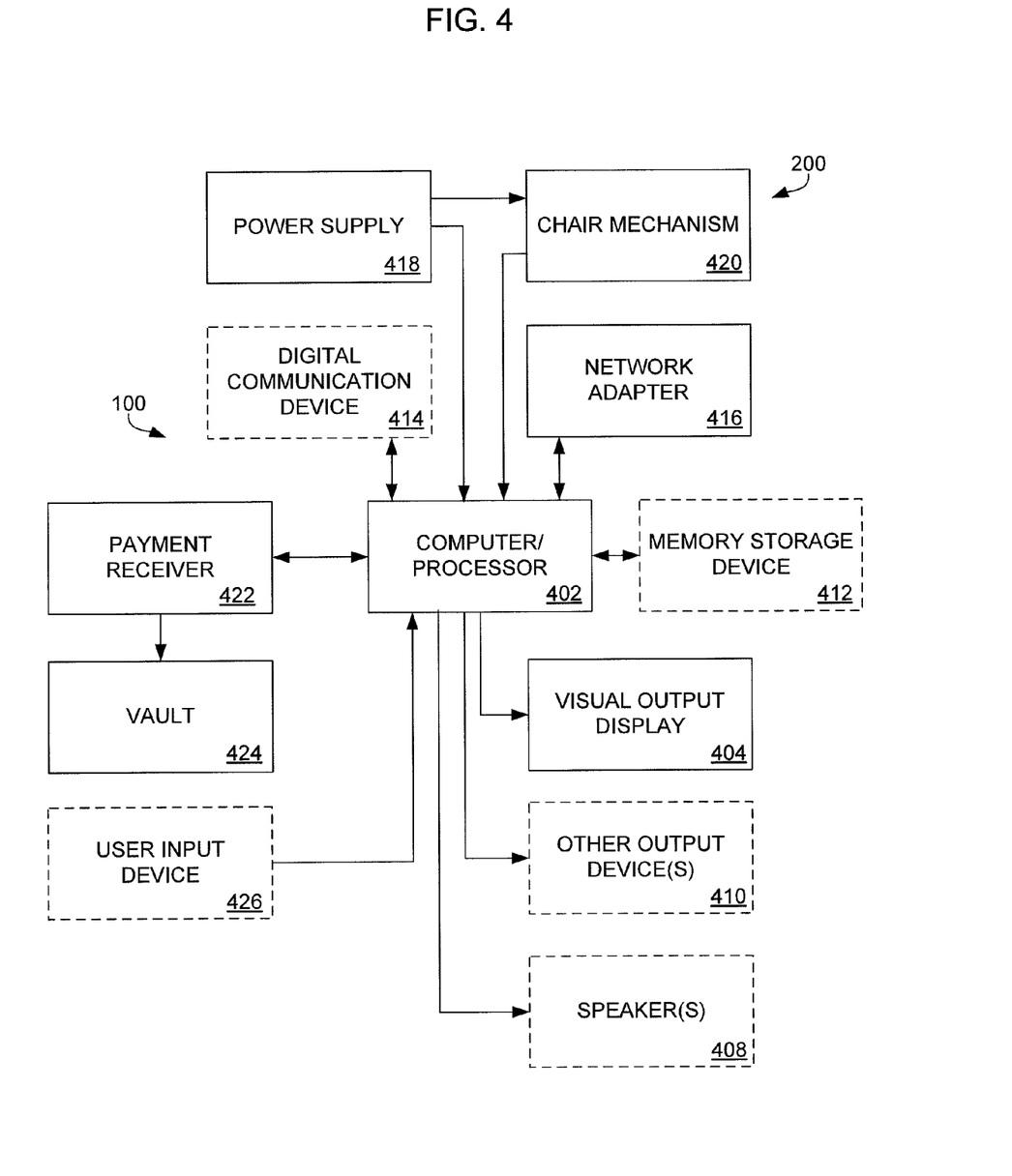
FIG. 4 is a block diagram of various components and systems associated with a multimedia massage chair in accordance with the disclosure.

A block diagram of the interconnections between various electronic components and systems associated with the operation of the chair 200 in combination with the entertainment module 100 are shown in FIG. 4. An electronic processor or computer 402 is connected to a visual output display 404, for example, a monitor. In this embodiment, the computer 402 may be a computer "mother-board" having additional components associated therewith to enable operation of the computer 402. The visual output display 404 can be an LCD monitor that can be capable of touch-screen operation for input of commands to the computer 402. As can be appreciated, other output channels may be operatively associated with the computer 402. For example, the computer 402 may be connected to one or more speaker(s) 408 and/or another output device or devices 410, which are shown in dashed line. The speakers 408, which may also include headphone jacks, may be used for playing music or sound for videos selected by the user. The additional output device 410 may be a connection configuration for interfacing the computer 402 with a portable electronic device, for example, a portable MP3 music player, a digital camera, a cellular phone, and so forth.

The information displayed on the visual output display 404 may reside, in the form of electronic data, either locally within the machine or remotely. When information is stored remotely, it may be streamed or downloaded to the computer 402 via a dedicated electronic connection. When the information resides locally, an optional memory storage device 412 may be operably connected to the computer 402 or may otherwise be integrated therewith. The memory storage device 412 may be any kind of digital information storage device known in the industry, for example, a hard disk drive, a portable solid state memory device, random access memory (RAM) chips integrated onto a circuit board, and so forth. In the case where information is sent to/from the computer 402 remotely, the computer 402 may be connected to a digital communication device 414 that is arranged to receive and transmit information between the computer 402 and a remote server (not shown). The digital communication device 414 may be any type of remote digital communication device, for example, a cellular phone, modem, radio frequency (RF) transceiver, Bluetooth® communication device, and so forth.

The computer 402 may be interconnected with computers installed in other entertainment modules 100 when multiple units are installed together in clusters, for instance, in a shopping mall or airport terminal. To enable the interconnectivity of multiple computers 402 belonging to the same or an adjacent cluster, which are arrangements described in further detail below, a network adapter 416 may be operatively associated with the computer 402. The computer 402, via the network adapter 416, may create or participate in a local area network (LAN) along with other computers 402 that are operating in the vicinity.

The computer 402 receives electrical power from a power supply 418 during operation. The power supply 418 may have additional features, for example, battery backup or surge suppressing functionalities, which aid in the smooth and safe operation of the computer 402 in any environment, especially in the event of interrupted power. Moreover, the power supply 418 may enable the computer 402 to preserve its functional parameters or pertinent data, such as transaction or payment information, especially during use by a customer, in the event of loss of power. The power supply 418 may also be arranged to supply power for operation of a chair mechanism 420, which is shown generically as a block. The chair mechanism 420 includes one or more electric motors (not shown) operating respective massage mechanisms. The chair mechanism 420 may also include sensors communicating with the computer 402 and sending signals indicative of the presence of a user seated in the chair or various other operational parameters, for example, indications of malfunction in one or more of the electric motors. For example, the chair mechanism 420 may include a vibration or load sensor that can sense the presence of a user and/or indicate to the computer 402 that the one or more electric motors are functioning. The computer 402 may use such information to report the fault to a central location and/or adjust its operation to ensure customer satisfaction by, for example, not charging the user for a massage unless the chair mechanism is functioning properly with no faults reported.

The computer 402 is also connected to a payment receiver 422. The payment receiver 422 can be any device capable of interfacing with a user and receiving payment. Payment may be in any suitable form, for example, cash, credit cards, club points, and/or customer loyalty program credits if the entertainment module 100 is operating in a hotel, resort, casino, or cruise ship. The payment receiver 422 is connected to a vault 424 arranged to receive bills or coupons deposited in the payment receiver 422 for safekeeping until they are collected. When payment is deposited into the payment receiver 422 by a user, the payment receiver 422 may communicate pertinent information to the computer 402, such as, the amount of payment if by cash, the number and type of club points or coupons used, and other information relative to a credit card purchase. The computer 402 may process such payment information and allot the allowed and requested services to the user, be it time purchased for a massage, time to access the Internet, online purchase fees for songs or videos downloaded, and so forth. Special information and/or user commands or preferences of the user may be input to the computer 402 via an optional user input device 426 that is operably connected to the computer 402. The user input device 426 may be any type of interface useable by the user that communicates information entered by the user to the computer 402. The user input device 426 may be, for example, a keyboard, a touch pad for pointing a cursor such as those typically found on laptop computers, a trackball, switch, or joystick, and so forth.

Figure 5:
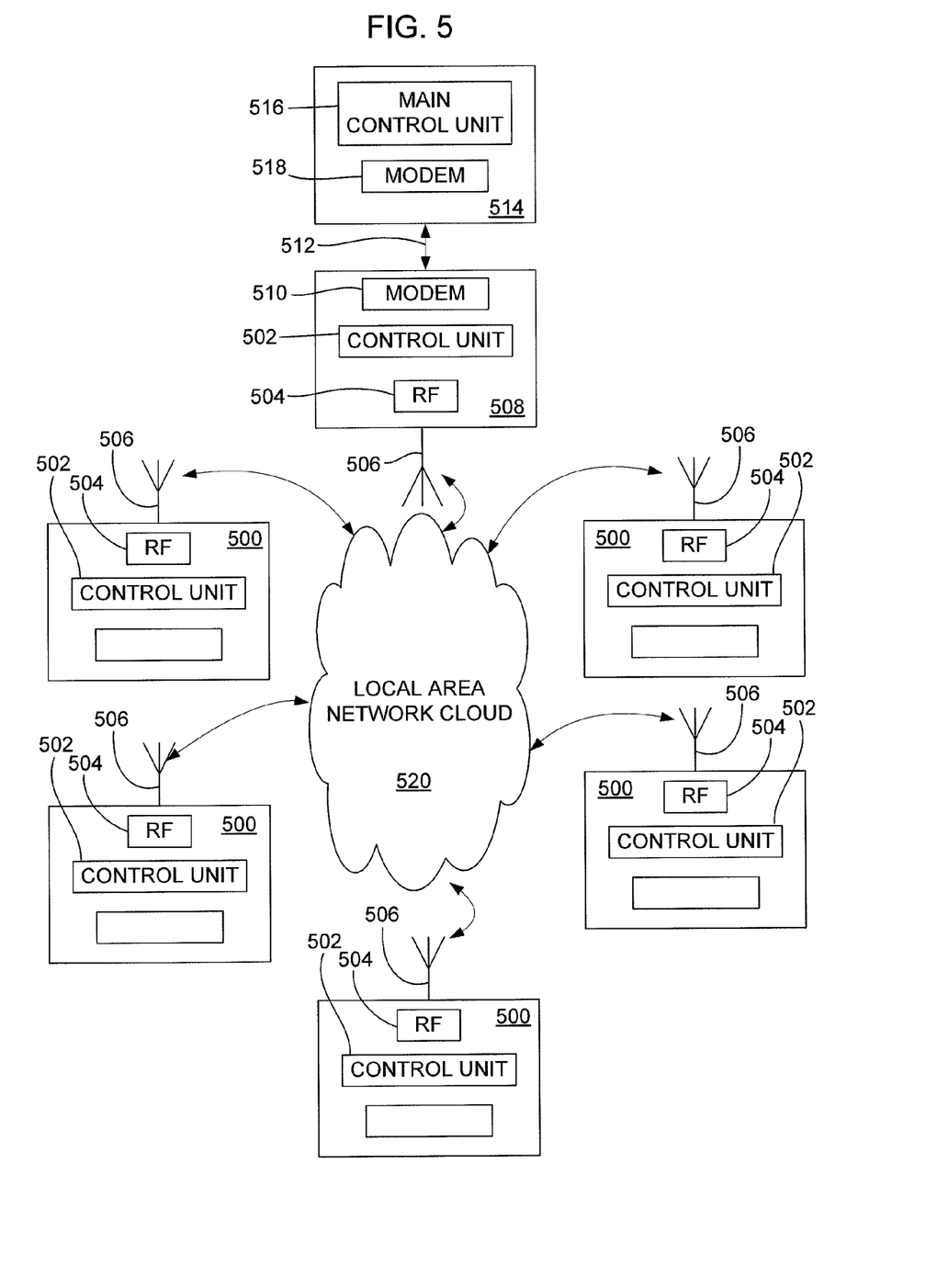
FIGS. 5 and 6 are block diagrams of two alternative embodiments for operating and interconnecting a cluster of multimedia massage chairs in accordance with the disclosure.
Figure 6:
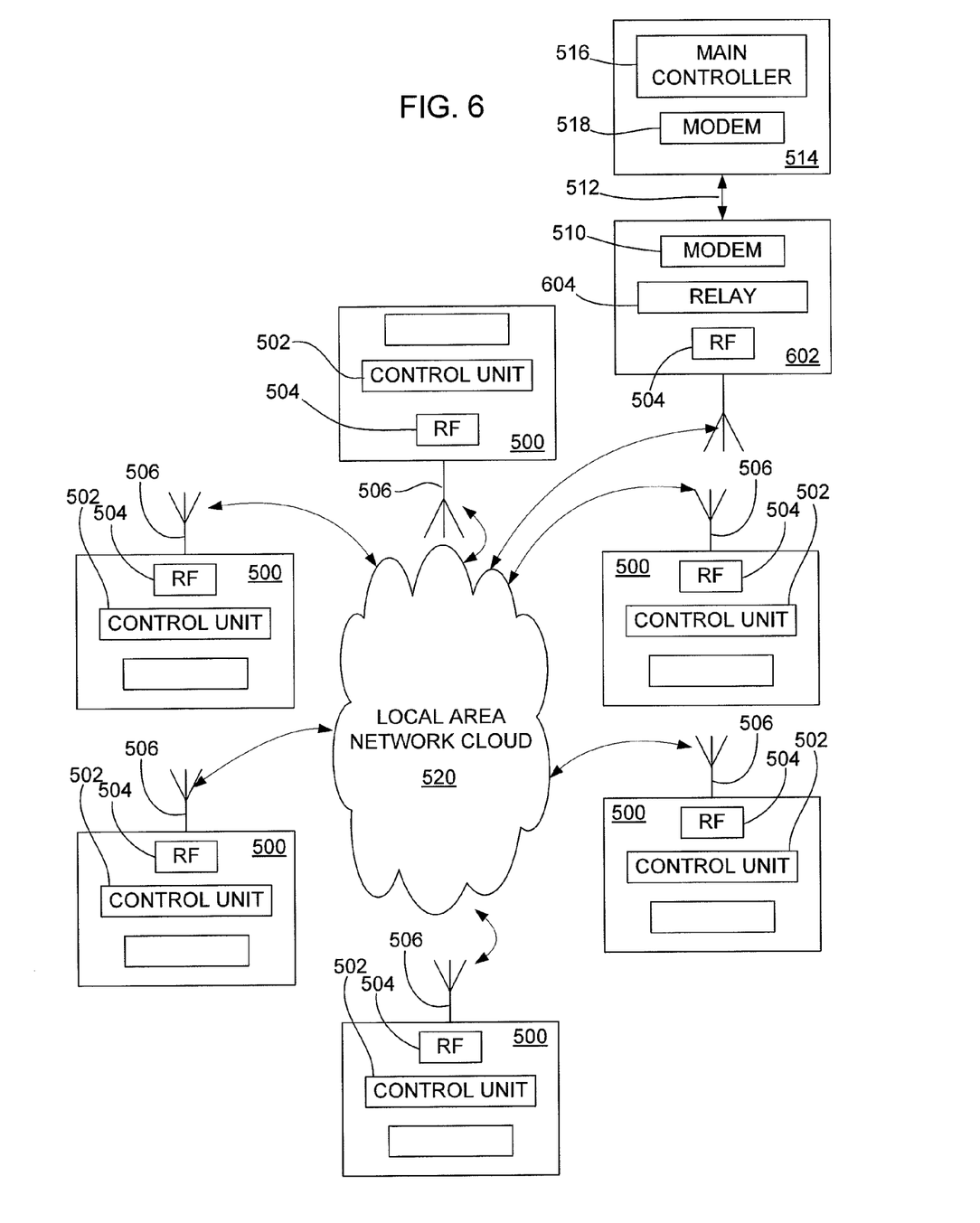

As mentioned above, a number of electronics modules, with associated massage chairs, may be clustered and/or networked together in public areas. A system diagram showing one embodiment for an arrangement of electronics modules 500 is shown in FIG. 5, and an alternate embodiment is shown in FIG. 6. Components and features common between the two embodiments are described together and denoted with common reference numerals for the sake of simplicity.

Each electronic module 500 making up the cluster is shown to include a control unit 502 connected to a network adapter 504. The network adapters 504 each have an antenna 506 associated therewith to enable two-way digital communication between the electronic modules 500, both to each other as well as with a master electronic module 508. The master electronic module 508, shown in FIG. 5, may be similar in many respects to the other electronic modules 500 in the cluster, but further include a modem 510 enabling communication between the master electronic module 508 and a central controller 514. Any information transmitted to and from each electronic module 500 may pass through the master electronic module 508.

In the embodiment of FIG. 5, the modem 510 may have a continuous or intermittent connection 512 with a central controller 514. The central controller 514 may be physically located at a different location than the master electronic module 508 such that the connection 512 can be performed in any suitable way, for example, via telephone lines, optical communication lines, cellular signals, Internet connection, radio signals, and so forth. The central controller 514 may include a main control unit 516 operating a computer program that manages information exchanged with each control unit 502 belonging to the cluster via a central modem 518. In the embodiment of FIG. 5, the master electronic module 508 is part of the cluster and is capable of providing services to the user in the same way as the other electronic modules 500 so as to appear no different from the other modules 500 to the user. In the alternate embodiment shown in FIG. 6, the cluster includes a plurality of electronic modules 500. The master electronic module 602 of this embodiment is a device dedicated for enabling communication between the electronic modules 500 and the central controller 514. Hence, the master electronic module 602 may include a relay 604, which may additionally include firewall and/or router capabilities, to facilitate the communication. The master electronic module 602 may be installed, for example, in a single location within a building and be used to serve one or more clusters of electronic modules 500 that have been installed in its vicinity.

By way of example, the main control unit 516 may contain information on the advertising presentations and/or other multimedia operating on each electronic module 500, including the master electronic module 508, such that updates or changes of the material presented may be made from a central location without requiring a service technician to visit each unit separately. Moreover, the central controller 514 may record and archive all transactions made by users on the electronic modules 500 and 508 belonging to this an other clusters installed in different locations or regions. Additionally, the central controller 514 may perform other "housekeeping" functions, such as, periodic queries for status information from each electronic module 500 indicative of component failure, money or coin levels, and so forth.

The electronic modules 500 connected to each other are at least capable of communicating with each other and also with their master electronic module 508 or 602. Even though the connections between the electronic modules 500 can be accomplished in any suitable way, their placement for service in public places makes a wireless communication mode advantageous. Therefore, the master electronic module 508 or 602 may be configured to create a wireless LAN infrastructure or cloud 520 that can connect each electronic module 500 to the rest and also to the central controller 514. The interconnection of the electronic modules 500 to each other can be used for the exchange of information, and to allow the users within a cluster to interact, for example, in playing a network-based game. Apart from the entertainment uses of the LAN cloud 520, the electronic modules 500 may use their respective LAN connections to connect to the Internet, report their transactions, report any hardware faults that may be present, and so forth.

Figure 7:
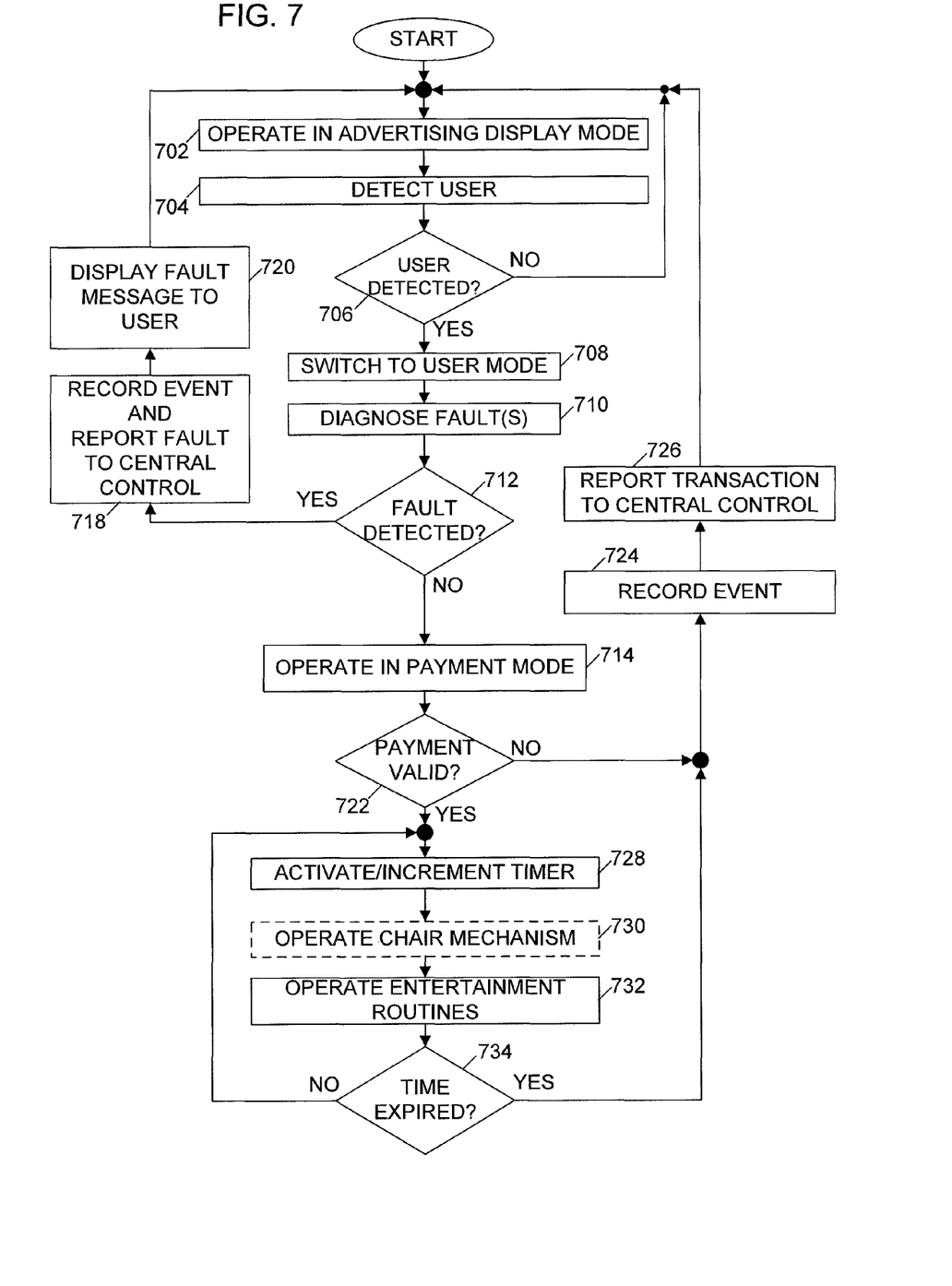
FIG. 7 is a flowchart for a method of operating a multimedia massage chair in accordance with the disclosure.

A flowchart for a method of generating revenue and providing electronic services to people found in public areas, such as, airport terminals, malls, and so forth, is shown in FIG. 7. Operation of the entertainment module 100 can be, by default, operation in an advertising mode when no users are using the module and the module is in a public area. Hence, the method of generating revenue, which includes revenue from advertisers displaying their information on the entertainment module 100, begins with operation in an advertising display mode at 702. As described above, the advertising display mode may include a series of periodically changing images, sounds, and/or video clips promoting products or services, which are included in the display in exchange for fees paid by the advertisers.

The electronic controller may continue operation in this mode until a user is detected at 704, for example, by responding to an input of the user or by sensing the presence of the user with a sensor. When a user that is willing to use the services of the electronic module is detected, a decision is made at 706 to switch operation from the advertising mode into a user mode at 708. If the user is using the chair to sit and does not want to utilize or engage the services of the electronic module, for example, by not pressing any buttons or entering payment for a predetermined time after sitting in the chair, the process may return to the advertising mode at 702.

After operation has switched to the user mode at 708, a visual display may begin presenting the user with various options and prices associated with the entertainment or other services provided by the massage chair. Before any services are offered, the electronic module may first perform a diagnosis for any faults that may be present at 710, and if no faults are detected at 712, proceed with offering services for payment by entering into a payment mode at 714. If a fault is detected at 712, the electronic module may cause the fault to be reported to the central controller at 718 via an appropriate method via a digital communication channel, as described above, display a fault message to the user informing the user of the unavailability of service at this particular location at 720, potentially instruct the user to move to a different massage chair in the cluster that is functional and available, and then return to the default advertising mode at 702.

If there are no faults found and the process reaches the payment mode operation at 714, which may include activating a payment receiver, a determination is made on whether the payment rendered by the user is valid at 722. Validity of the payment may include, for example, recognition of the type and amount entered in cash, pre-authorization of a credit card for the amount to be charged, validation of club points if payment is made as part of a club, and so forth. If payment is insufficient or invalid, the user may receive a refund, if applicable, and then the process will cause the transaction to be recorded either locally or remotely at 724 and reported to the central controller at 726, and operation in the advertising mode at 702 will be resumed.

When the determination at 722 is positive, meaning that payment is adequate and/or valid, the process continues with activating various other processes aimed at providing the user with the selected services for the predetermined time the user selects. Hence, a timer is activated at 728 that will track the user's time purchased and time remaining. Thereafter various other functions will be activated for the user's enjoyment, for example, a massage chair mechanism can be activated at 730, and various entertainment routines including Internet access, music, video clips, teleconferencing, and other digital services can be activated at 732.

While the various services are activated, the process will continuously monitor the time to ensure that the user is provided the requested services for the appropriate amount of time. Therefore, a determination of whether the time is reached at 734 will keep the process in the entertainment mode so long as the applicable time limit has not been reached. When the time limit has been reached, i.e., when the user has exhausted the time that has been paid for use of the various services, the process will exit the entertainment services, record the transaction at 724, and report the transaction to the central controller at 726 as described above. As can be appreciated, the amount of time services are provided may depend on the amount of payment received or, for on-demand services, on the time of the purchased event. Further, the massage functions may be suspended while the entertainment routines are active, at the user's discretion, to enable prolonged presence of the user in the chair.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of operating a multimedia chair, comprising:
    operating a visual display in an advertising mode, the visual display periodically displaying one of a plurality of pre-determined advertisements;
    detecting presence of a user in a chair;
    switching to a user mode when the user is seated and interacting with the chair;
    receiving and processing payment from the user for use of services for a predetermined period of time;
    activating a timer and incrementing the timer during the predetermined period of time;
    operating at least one entertainment routine while the timer is incremented;
    selectively operating a massage function of the chair while the timer is incremented; and
    recording and reporting a transaction to a central controller when the timer has run.

2. The method of claim 1, wherein operation of the visual display in the advertising mode includes cyclically presenting a series of promotional screens that are stored in a memory storage device that is programmable at least one of locally by a service technician and remotely by the central controller.

3. The method of claim 1, wherein the at least one entertainment routine includes communicating with a remote computer over at least one of a local area connection, a wireless local area network, a telephone line, a digital communication link, and the Internet via a network adapter.

4. The method of claim 1, further including capturing a digital picture with a camera, and at least one of sending the digital picture electronically to a remote location and printing the digital picture locally.

5. The method of claim 1, further including dispensing coupons from a coupon dispenser to the user.

6. The method of claim 1, wherein operating the visual display in the advertising mode includes reproducing pictures, video, and sound.

7. The method of claim 1, further including interconnecting the multimedia chair with a plurality of additional multimedia chairs forming a cluster, each of the plurality of additional multimedia chairs being in communication with the multimedia chair over a local area computer network.

8. A method for generating a revenue stream from at least one multimedia chair, comprising:
   placing a multimedia chair in a public area;
   operating the multimedia chair in an advertising mode when a user is not present,
   wherein operating in the advertising mode includes periodically representing on a visual output display a series of advertisements, each advertisement including at least one of images, video, and sound,
   wherein each of the series of advertisements is provided by a respective advertiser and is displayed in exchange for an advertising fee; and
   operating the multimedia chair in an entertainment mode when the user is present;
   wherein operating the multimedia chair in the entertainment mode includes activating at least one electric motor operating a massage function on a user seated in the multimedia chair; and
   providing digital services to the user when operating in the entertainment mode, the digital services including Internet access, email access, teleconferencing, electronic games, music purchases, and video viewing.

9. The method of claim 8, wherein operating the multimedia chair in the entertainment mode includes sensing a presence of the user in the multimedia chair.

10. The method of claim 8, further including operating a computer that is integrated with an electronics module, the electronics module being part of the multimedia chair.

11. The method of claim 8, further including interconnecting the multimedia chair with a local area network, the local area network adapted to enable two-way digital communication between the multimedia chair and a remote computer.

12. The method of claim 11, wherein the remote computer operably communicates with a plurality of multimedia chairs.

* * * * *